United States Patent
Sawai

(10) Patent No.: US 7,587,689 B2
(45) Date of Patent: Sep. 8, 2009

(54) METHOD OF SUPPORTING WIRING DESIGN, SUPPORTING APPARATUS USING THE METHOD, AND COMPUTER-READABLE RECORDING MEDIUM

(75) Inventor: Masayoshi Sawai, Kosai (JP)

(73) Assignee: Yazaki Corporation, Tokyo (JP)

( * ) Notice: Subject to any disclaimer, the term of this patent is extended or adjusted under 35 U.S.C. 154(b) by 293 days.

(21) Appl. No.: 11/097,273

(22) Filed: Apr. 4, 2005

(65) Prior Publication Data

US 2005/0222824 A1  Oct. 6, 2005

(30) Foreign Application Priority Data

Apr. 5, 2004  (JP) .................. P 2004-110992

(51) Int. Cl.
    *G06F 17/50* (2006.01)
(52) U.S. Cl. .............................. 716/4; 716/6
(58) Field of Classification Search .......... 716/2, 716/4–6, 18, 1
    See application file for complete search history.

(56) References Cited

U.S. PATENT DOCUMENTS

| | | | | |
|---|---|---|---|---|
| 5,655,108 A | * | 8/1997 | Uchiyama | 716/4 |
| 7,124,069 B2 | * | 10/2006 | Meuris et al. | 703/13 |
| 7,206,723 B2 | * | 4/2007 | Sawai et al. | 703/1 |
| 7,260,811 B2 | * | 8/2007 | Sawai | 716/20 |
| 2004/0167752 A1 | * | 8/2004 | Sawai | 703/1 |
| 2004/0172151 A1 | * | 9/2004 | Sawai et al. | 700/103 |
| 2005/0203663 A1 | * | 9/2005 | Sawai | 700/182 |

FOREIGN PATENT DOCUMENTS

JP  2004-139570 A  5/2004

OTHER PUBLICATIONS

Kimihiko Yasuda, "Mode Analysis and Dynamic Design", issued by the Corona Publishing Co., ltd., Nov. 10, 1993, pp. 54-56.
B. Nath, "Matrix Finite Element Method" (original Title: Fundamentals of Finite Elements for Engineers), Brain Books Publishing Co., Ltd., Aug. 10, 1978, pp. 7-15.

* cited by examiner

*Primary Examiner*—Jack Chiang
*Assistant Examiner*—Binh C Tat
(74) *Attorney, Agent, or Firm*—Sughrue Mion, PLLC

(57) ABSTRACT

A method of supporting an optimum wiring design of a linear structure, includes steps of providing a finite element model of both of the linear structure and a support member which supports the linear structure, the finite element model being formed as an elastic body having a plurality of combined beam elements which retain linearity, setting physical properties and restriction conditions of the linear structure and the support member to the finite element model, calculating a predictive shape of the finite element model which is in a physically balanced condition based on the physical properties and the restriction conditions, and outputting a calculation result of the calculation process.

3 Claims, 10 Drawing Sheets

FIG. 2

| SUPPORT MEMBER | DEGREE OF FREEDOM OF RESTRICTIONS | TRANSLATION IN THE DIRECTION OF X-AXIS | TRANSLATION IN THE DIRECTION OF Y-AXIS | TRANSLATION IN THE DIRECTION OF Z-AXIS | ROTATION AROUND X-AXIS | ROTATION AROUND Y-AXIS | ROTATION AROUND Z-AXIS |
|---|---|---|---|---|---|---|---|
| CONNECTOR | COMPLETE RESTRICTION | IMPOSSIBLE | IMPOSSIBLE | IMPOSSIBLE | IMPOSSIBLE | IMPOSSIBLE | IMPOSSIBLE |
| ELONGATED HOLE CLIP | COMPLETE RESTRICTION | IMPOSSIBLE | IMPOSSIBLE | IMPOSSIBLE | IMPOSSIBLE | IMPOSSIBLE | IMPOSSIBLE |
| ROUND HOLE CLIP | ROTARY RESTRICTION | IMPOSSIBLE | IMPOSSIBLE | IMPOSSIBLE | IMPOSSIBLE | IMPOSSIBLE | POSSIBLE |
| CORRUGATED ELONGATED HOLE CLIP | ROTARY RESTRICTION | IMPOSSIBLE | IMPOSSIBLE | IMPOSSIBLE | POSSIBLE | IMPOSSIBLE | IMPOSSIBLE |
| CORRUGATED ROUND HOLE CLIP | ROTARY RESTRICTION | IMPOSSIBLE | IMPOSSIBLE | IMPOSSIBLE | POSSIBLE | IMPOSSIBLE | POSSIBLE |
| BRANCH POINT | COMPLETE RESTRICTION | POSSIBLE | POSSIBLE | POSSIBLE | POSSIBLE | POSSIBLE | POSSIBLE |

FIG. 4A
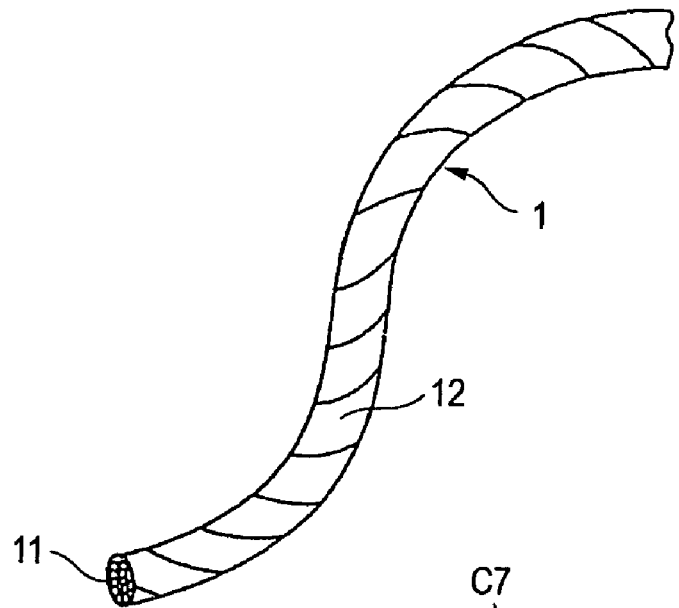
FIG. 4B
FIG. 4C
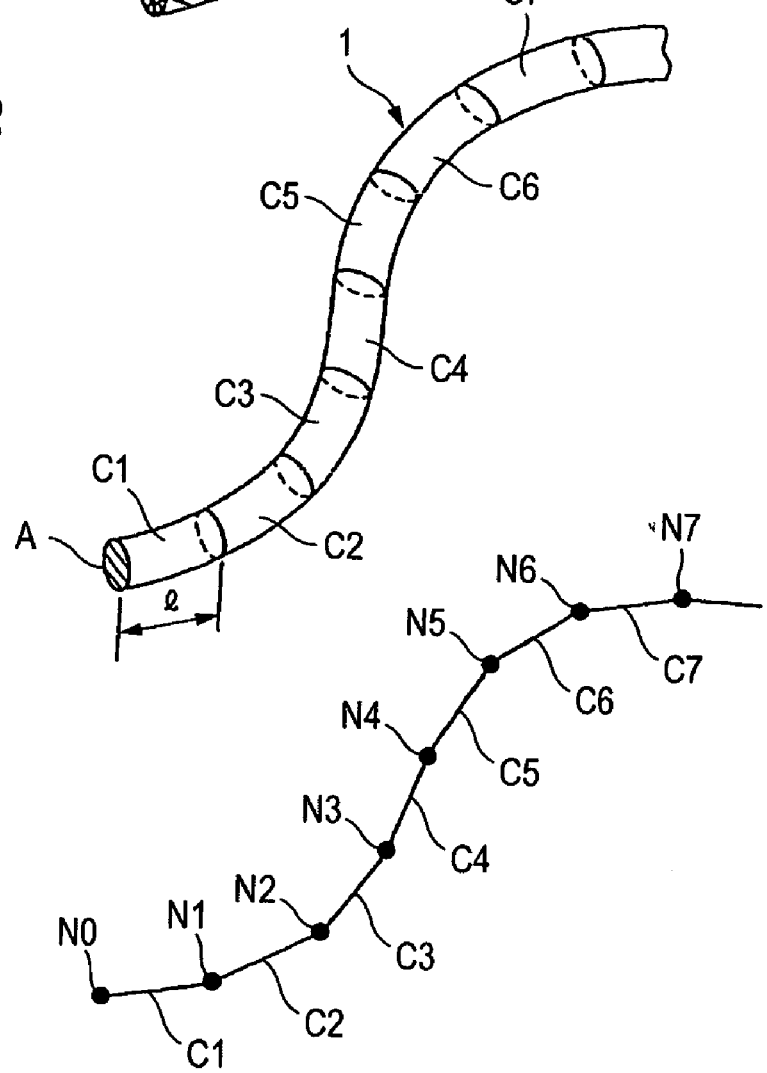

METHOD OF SUPPORTING WIRING DESIGN, SUPPORTING APPARATUS USING THE METHOD, AND COMPUTER-READABLE RECORDING MEDIUM

BACKGROUND OF THE INVENTION

The present invention relates to a method of supporting a wiring design of a linear structure, such as a wire harness, a supporting apparatus using the method, and a computer-readable recording medium.

A vehicle and the like is mounted with a plurality of electric parts, which are connected together by a so-called wire harness as a linear structure in which a plurality of linear members, such as electric wires, communication wires and the like are bundled in a binding member, such as an insulating lock and the like, and an outer armoring member, such as a tape. As shown in FIG. 1, connectors 2a, 2b, 2c, 2d joined to electric parts and the like are provided at end portions of a wire harness 1. Also, various kinds of clips 3a, 3b, 3c, 3d, and a branch point 4 are provided at intermediate portions of the wire harness. The branch lines of the wire harness 1, which form the sections of the wire harness 1 which extend from the end portions thereof to the branch point 4, have basically different number and kinds of structural filament members. Therefore, the thickness, length, density and the like of the branch lines are various.

The design for wiring such a wire harness in a vehicle and the like has been made in many cases by making calculations by using multipurpose analytic software called CAD (Computer Aided Design) and CAE (Computer Aided Engineering), or on the basis of a designer's experience and perception. However, since a linear structure, such as a wire harness and the like is diverse, merely using the multipurpose analytic software and merely relying upon a designer's experience do not meet the purpose, i.e., it is very difficult to design the linear structure by accurately anticipating the rigidity of the linear structure with respect to the bend and distortion of each portion thereof.

Under the above circumstances, the applicant of the present invention proposed by JP-A-2004-139570, and so forth a method of supporting an optimum wiring design by calculating a predictive shape of a linear structure with the physical property of a linear structure, such as a wire harness, i.e. a material thereof and the rigidity thereof with respect to the bend and distortion of each portion thereof taken into consideration, and by displaying the condition of the linear structure of gradual variation of from an initial shape to a predictive shape thereof, by utilizing a finite element process.

Here, the documents cited in the specification of the present invention will now be shown below.

JP-A-2004-139570

"Matrix Finite Element Process" written by B. Nass, published by the Brain Book Publishing Co., Ltd., Aug. 10, 1978, p. 7 to 15.

"Mode Analysis and Dynamic Design" written by Hitohiko Yasuda, issued by the Corona Co., Ltd., Nov. 10, 1993, p. 54 to 56.

The method of Patent Publication 1 is extremely excellent in that the predictive shape of the linear structure can be precisely calculated considering the physical properties of the linear structure, such as the material or the rigidity against the bending or torsion of each portion. Nevertheless, what has been done on the support member such as the connectors 2a, 2b, 2c and 2d and the clips 3a, 3b, 3c and 3d is to give their center axes only the restriction conditions, as will be described with reference to FIG. 2.

By giving such restriction conditions on the support member, the predictive shape of the wire harness is calculated by the method of Patent Publication 1. Then, the wire harness takes a shape, as indicated by 1z in FIG. 3. Specifically, the portion of the wire harness, to which a complete restriction type support member 3 is attached, is handled as the complete restriction throughout the entire length of the support member 3. In FIG. 3, letters FX indicate the point of the complete restriction.

As a matter of fact, however, the support member has different rigidities at a portion corresponding to the center axis and at portions corresponding to the two end portions. In the case of the complete restriction type support member such as a clamp, for example, the portion corresponding to the center axis CX is subjected to the complete restriction, but the portions corresponding to the two end portions are displaced according to the rigidity. As a result, the support member is inclined, as indicated at 3', if the point FX is subjected to the complete restriction. Then, the wire harness takes the predictive shape depending on the inclination, as indicated by 1z'.

In other words, the method of Patent Publication 1 has failed to consider the physical properties such as the rigidity of the support member. It is, therefore, found that the predictive shape of the wire harness may be different from the actual one, and that the method has room for further improvement.

SUMMARY OF THE INVENTION

In view of the background thus far described, therefore, the invention has an object to provide a wring design aiding process capable of designing the wiring of a linear structure more practically by calculating the predictive shape of the linear structure while supposing the rigidity or the like of a support member, and an apparatus and a program for the process.

In order to achieve the above object, according to the present invention, there is provided a method of supporting an optimum wiring design of a linear structure, comprising:

providing a finite element model which corresponds to both of the linear structure and a support member which supports the linear structure, the finite element model being formed as an elastic body having a plurality of combined beam elements which retain linearity;

setting physical properties and restriction conditions of the linear structure and the support member to the finite element model;

calculating a predictive shape of the finite element model which is in a physically balanced condition based on the physical properties and the restriction conditions; and outputting a calculation result of the calculation process.

Preferably, the support member is a complete restriction type support member. A complete restriction is applied to a joint corresponding to a center axis of the support member as one of the restriction conditions. A complete freedom is applied to a joint corresponding to other than the center axis of the support member as one of the restriction conditions.

Here, it is preferable that the method further comprising a process of calculating an inclination of the support member with respect to a predetermined reference line on the basis of the joint corresponding to the center axis of the support member and joints corresponding to two end portions of the support member. The outputting process outputs the inclination of the support member along with the calculation result.

Here, it is preferable that, a supporting apparatus for supporting an optimum wiring design of a linear structure, comprising:

a providing unit which provides a finite element model of both of the linear structure and a support member which supports the linear structure, the finite element model being formed as an elastic body having a plurality of combined beam elements which retain linearity;

a setting unit which sets physical properties and restriction conditions of the linear structure and the support member to the finite element model;

a calculating unit which calculates a predictive shape of the finite element model which is in a physically balanced condition based on the physical properties and the restriction conditions; and an outputting unit which outputs a calculation result calculated by the calculating unit.

Here, it is preferable that, a computer-readable recording medium for causing a computer to execute the above methods of supporting an optimum wiring design of a linear structure.

In view of the above methods and configuration, a finite element model is created as a finite element model by making an objective linear structure and a support member of the linear structure as an elastic body, in which a plurality of beam elements having a kept linearity are combined; the predictive shape in the physically balanced state of the finite element model is calculated in accordance with the physical characteristics and the restriction conditions of the linear structure and the support member given to the finite element model; and the calculation result is outputted. In short, the predictive shape is calculated supposing even the physical properties of the support member. Thus, the predictive shape is calculated by using the finite element method while supposing even the physical properties of the support member. It is, therefore, possible to design the wiring of the linear structure more practically.

In view of the above methods, moreover, a complete restriction is given as a kind of the restriction conditions to a joint corresponding to the center axis of the support member, and a complete freedom is given as a kind of the restriction conditions to a joint corresponding to other than the center axis of the support member. It is, therefore, possible to calculate the predictive shape of the linear structure, more precisely, in case the complete restriction type support member is attached to the intermediate portion.

In view of the above methods, an inclination of the support member is determined with respect to a predetermined reference line on the basis of the joint corresponding to the center axis and joints corresponding to two end portions, and is outputted. Therefore, effective information is provided at the time of selecting the support member. Therefore, the information is also effective for the optimum wiring design of the linear structure.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a diagram showing relations between representative support members to be attached to the wire harness and the degrees of freedom from restrictions;

FIG. 4A is a diagram showing the appearance of the wire harness, FIG. 4B is a diagram showing a discrete behavior of the wire harness of FIG. 4A, and FIG. 4C is a diagram expressing the wire harness of FIG. 4A with beam elements and joints;

DETAILED DESCRIPTION OF THE PREFERRED EMBODIMENTS

Figure 1:
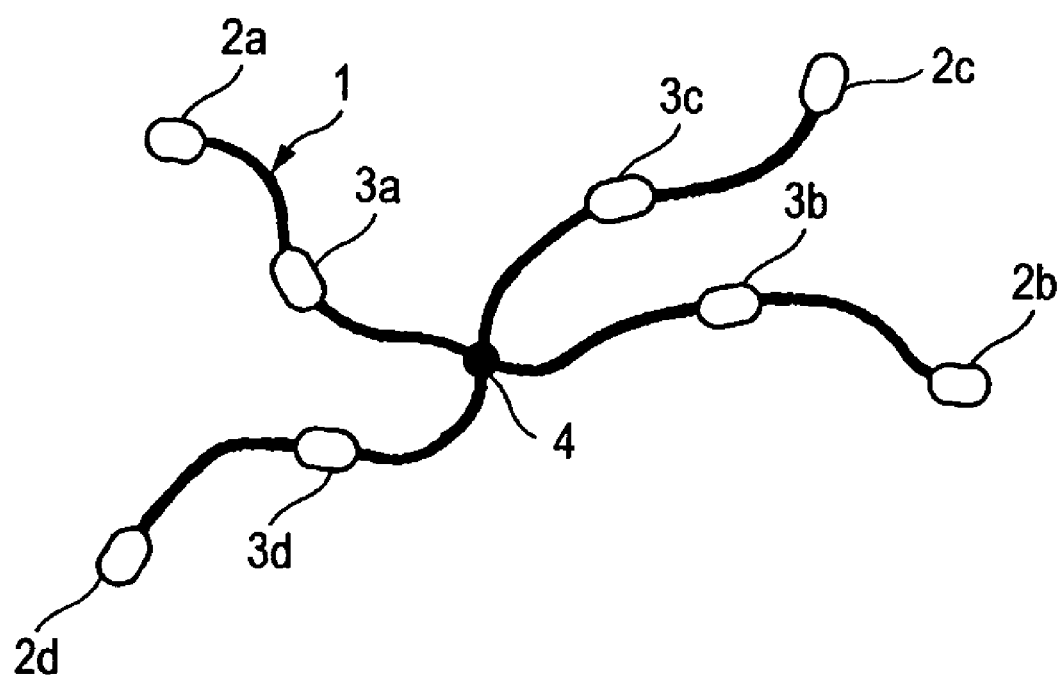
FIG. 1 is a diagram showing an example of an objective wire harness schematically.

The embodiments of the present invention will now be described on the basis of the drawings. First, an example of a wire harness as an object linear structure and a typical support member will be described in FIG. 1 and FIG. 2. FIG. 1 is a drawing schematically showing an example of an object wire harness. FIG. 2 is a diagram showing the relation between typical support members fixed to the wire harness and the degree of freedom of restrictions.

Connectors 2a, 2b, 2c, 2d for connecting electric parts (not shown) are mounted at both end portions of the wire harness 1. Various kinds of clips 3a, 3b, 3b, 3c are mounted to intermediate portions of the wire harness 1, which further has a branch point 4. Since the branch lines of the wire harness 1 have basically different number and kind of structural filament members, the thickness, length, elasticity, density and the like thereof are also different.

The connectors 2a, 2b, 2c, 2d are detachably joined to fixed portions and predetermined portions, which are in accordance with the part fixing direction, of connectors on the side of an electric part, and the end portions of the wire harness are thereby completely restricted. The clips 3a, 3b, 3c, 3e completely restrict or rotationally restrict predetermined portions of the wire harness with respect to predetermined portions of a body and a stay of a vehicle.

A description of the clips will now be added. The clips basically include an elongated hole clip, and a round hole clip. A round hole clip is also called a rotary clip, and has a base seat portion for retaining the wire harness, and a support leg inserted into a round fixing hole provided in a stay and the like. The round hole clip can be rotated around a Z-axis (perpendicular direction of a fixing portion).

The elongated hole clip is also called a fixed clip, and has a base seat portion for retaining the wire harness, and a support leg inserted into an elongated fixing hole provided in a stay and the like. This support leg has an elongated hole-like cross-sectional shape substantially identical with the cross-sectional shape of the fixing hole. The elongated hole clip is non-rotatable around the Z-axis.

The elongated hole clips and round hole clips include corrugated elongated hole clips rotatable around an X-axis (longitudinal direction of the wire harness), and corrugated round hole clips. The degrees of freedom of restriction in the axial directions and in the directions around the axes of such clips are as shown in FIG. 2.

Referring to FIG. 2, the X-axis, Y-axis and Z-axis correspond to three straight lines in a right-hand local coordinate system on joints (or called nodes as well) on the wire harness. For example, the Z-axis is set so that the Z-axis is in alignment with the clip axis. These setting methods can be changed suitably depending upon the functions in use. The drawing also shows for reference the degrees of freedom of restriction of the branch point. A joint, though it is not shown in the drawing, set arbitrarily on the portion of the wire harness which is other than the above-mentioned restriction point is basically completely free. Such a degree of freedom of restriction is set on each joint for making calculations of predictive paths which will be described later.

Figure 5:
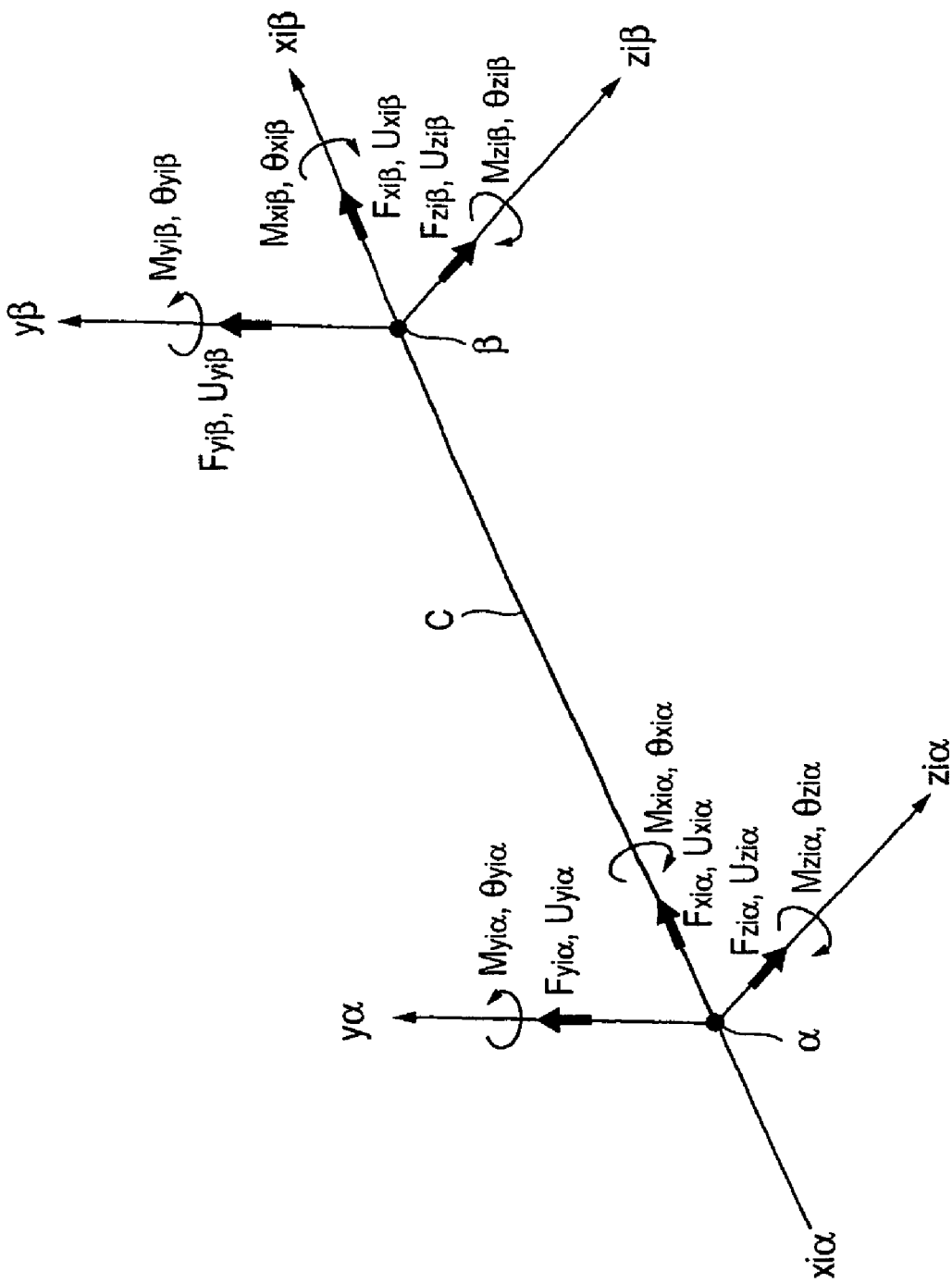
FIG. 5 is a diagram for explaining the degrees of freedom in the wire harness with the beam elements and the joints.
Figures 6A, 6B:
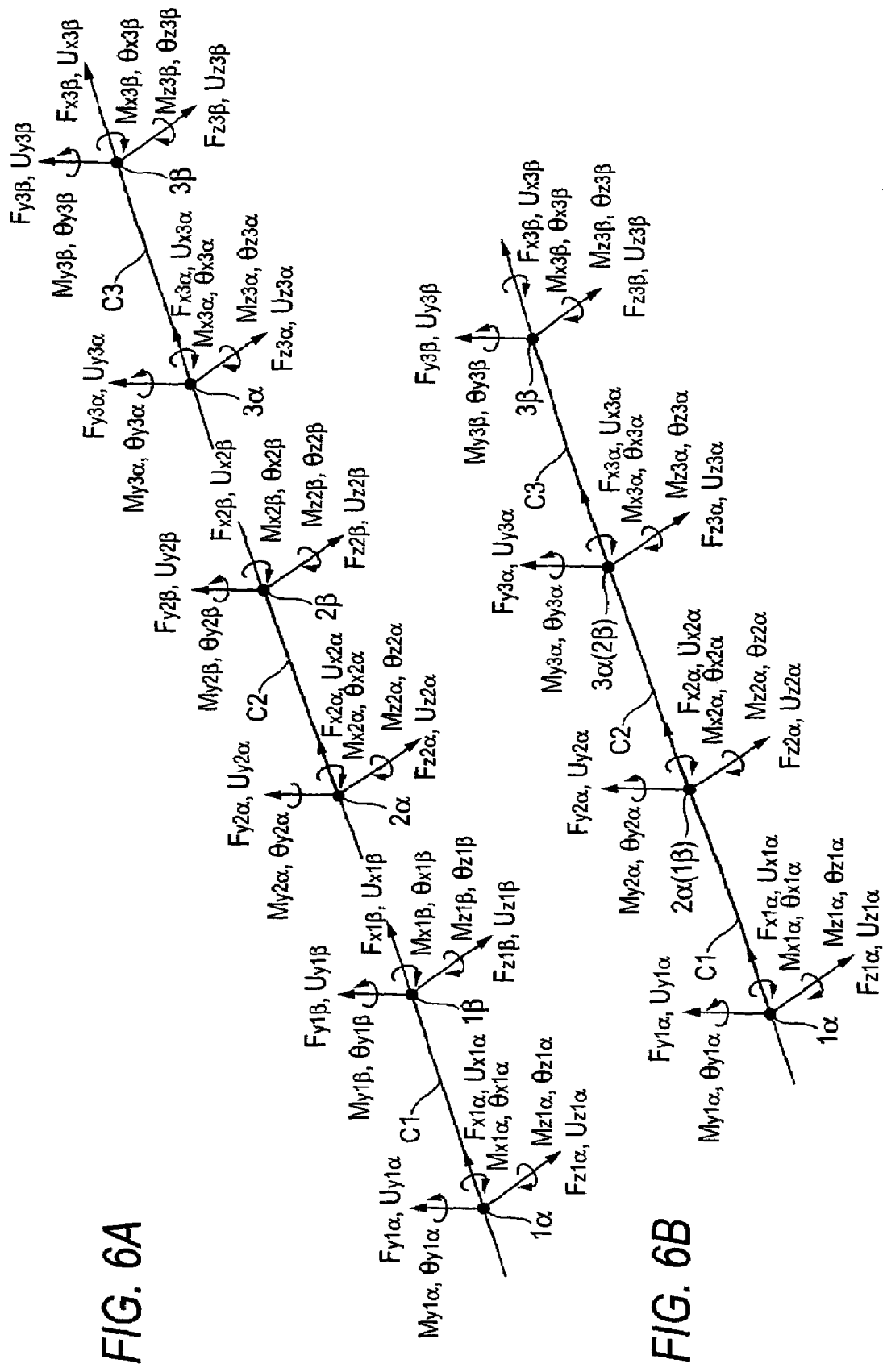
FIG. 6A is a diagram expressing the wire harness with three beam elements.
FIG. 6B is a diagram showing the state, in which the three beam elements are combined.

Referring then to FIG. 4 to FIG. 6, the outlines of the hypothetic conditions constituting the premises of the present invention, theories utilized and basic equations will now be described. FIG. 4A is a drawing showing an external view of a wire harness, FIG. 4B a drawing showing a discrete condition of the wire harness of FIG. 4A, and FIG. 4C a drawing representing the wire harness of FIG. 4A by beam elements and joints. FIG. 5 is a drawing for describing the degree of freedom in the wire harness represented by beam elements and joints. FIG. 6A is a drawing representing the wire harness by three beam elements, and FIG. 6B a drawing showing the condition of the three beam elements of FIG. 6A combined together.

First, according to the present invention, the following hypotheses are built up under use of the finite element method for designing the wire harness.

(1) It is assumed that the wire harness is made of an elastic body.
(2) It is assumed that the wire harness is a combination of beam elements.
(3) It is assumed that each beam element retains the linearity.

Setting the wire harness hypothetically as beam elements means that the wire harness is also set hypothetically as a uniform cross section, i.e. a homogeneous cross section. The cross section is assumed to be circular but it is not always necessary to assume the cross section in this manner. However, in the following statement, a description will be given with the cross section of the wire harness assumed to be circular.

When such a hypothesis is formed, the applying of the finite element method to the wire harness, which has not heretofore been applied thereto, becomes possible.

First, the wire harness is discretized. The wire harness formed by binding a plurality of electric wires 11 by an armoring material, such as a tape 12 as shown in FIG. 4A can be regarded as a continuous body. As shown in FIG. 4B, such a wire harness 1 is divided (discretized) into some beam elements C1, C2, C3, . . . . Namely, the wire harness is like one rope, so that the wire harness can be regarded as finite pieces of connected beam elements.

Therefore, as shown in FIG. 4C, the wire harness can be expressed as a combination of a plurality of beam elements C1, C2, C3, . . . connected to one another by a plurality of nodes N1, N2, N3, . . . . The characteristic values necessary for the beam elements are as follows.

Length I (refer to FIG. 4B)

Cross-sectional area A (refer to FIG. 4B)

Second moment of area I

Second polar moment of area J (also called torsional resistance coefficient)

Longitudinal elastic modulus E

Lateral elastic modulus G

In order to determine these values, a density $\rho$ and a Poisson's ratio $\mu$, etc. are also used, though they are not directly shown in these characteristic values.

In the specification of the present invention, the parameters concerning the physical properties directly determining an outer shape of a linear structure are called outer shape parameters, and the parameters concerning the physical properties other than the outer shape parameters, such as the second moment of area I, polar moment of area J, longitudinal elastic modulus E and lateral elastic modulus G, density $\rho$, Poisson's ratio $\mu$, etc. shall be called non-outer shape parameters.

As shown in FIG. 5, each beam element (C1, C2, C3, . . . ) has two nodes $\alpha$ and $\beta$. In the three-dimensional space, the node a has three translational components and three rotational components, so that the node has a total of six degrees of freedom. The same applies to the other node $\beta$. Therefore, the beam element C necessarily has twelve degrees of freedom.

Referring to the drawing, the following reference letters and symbols represent:

$F_{xi}$: Nodal force in an xi axial direction of i-th element $F_{yi}$: Nodal force in a yi axial direction of i-th element $F_{zi}$: Nodal force in a zi axial direction of i-th element $M_{xi}$: End moment around the xi axis of the i-th element (the right-handed screwing direction shall be a positive direction)

$M_{yi}$: End moment around the yi axis of the i-th element (the right-handed screwing direction shall be a positive direction)

$M_{zi}$: End moment around the zi axis of the i-th element (the right-handed screwing direction shall be a positive direction)

$U_{xi}$: Displacement in the xi direction of the i-th element $U_{yi}$: Displacement in the yi direction of the i-th element $U_{zi}$: Displacement in the zi direction of the i-th element $\theta_{xi}$: Angular displacement around the xi axis of the i-th element (the right-handed screwing direction shall be a positive direction)

$\theta_{yi}$: Angular displacement around the yi axis of the i-th element (the right-handed screwing direction shall be a positive direction)

$\theta_{zi}$: Angular displacement around the zi axis of the i-th element (the right-handed screwing direction shall be a positive direction)

$\alpha$ represents a left side node, and the other $\beta$ a right side node.

In the structural mechanics accompanying such a large deformation as that of a wire harness and the like, a balance equation of a finite element method is generally $$([K]+[K_G])\{x\}=\{F\} \quad (1)$$

wherein [K] is a general rigidity matrix, [$K_G$] an overall geometric rigidity matrix, {x} a displacement vector, and {F} a load vector (also called a force vector).

However, since the equation (1) is algebraically a nonlinear simultaneous equation, the equation cannot be solved as it is in a practical numerical analysis. Therefore, an incremental method in which a load value is fractionized and gradually added is necessarily employed (the same applies to a case where forced displacement occurs). In consequence, the balance equation (1) is also expressed by the following incremental system.

$$([K]+[K_G])\{\Delta x\}=\{\Delta F\}-\{R\} \quad (1)'$$

wherein $\{\Delta F\}$ is a value of load increment, $\{\Delta x\}$ incremental deformation in an incremental step, and $\{R\}$ a correction vector for a load vector.

In each incremental section, calculations are made with the balance equation regarded as a linear equation, and a balancing force ((vector $\{R\}$ in the equation (1)')) occurring during this time is reduced to a level in a tolerance by a method of repetition before a subsequent step is taken. In a series of these algorithms, a known method, for example, a Newton-Raphson method and an arc length method are utilized.

When a forced displacement is designated as in the prediction of a shape, omitting the overall geometric rigidity matrix $[K_G]$ in a second item out of a left side of the balance equation, the results of a good quality are obtained in many cases. The overall geometric rigidity matrix is omitted in this case as well.

The overall rigidity matrix [K] in a first item of a left side of the balance equation is obtained by converting the rigidity matrix of each element, which is rewritten as the coordinate value is changed momentarily in each incremental step, into a coordinate value in an overall coordinate system, and aggregating the values thus obtained. The concrete content of expression of the element rigidity matrix forming a basis is shown in the following equation (2).

a node $1\beta$ of the beam element C1 and that of displacement of a node $2\alpha$ of the beam element C2 become equal, and a force applied to these two nodes is also balanced. For the same reason, the quantities of displacement of the node $2\beta$ of the beam element C2 and node $3\alpha$ of a beam element C3 also become equal, and a force applied to these two nodes is also balanced. Therefore, owing to the continuity of the displacement and the satisfaction of the condition of equilibrium, the beam elements C1 and C2, and the beam elements C2 and C3 can be combined with each other as shown in FIG. 6B.

Referring to the drawings, the following reference letters and symbols represent:

$F_{xi}$: Nodal force in the xi axial direction of the i-th element $F_{yi}$: Nodal force in the yi axial direction of the i-th element $F_{zi}$: Nodal force in the zi axial direction of the i-th element $M_{xi}$: End moment around the xi axis of the i-th element $M_{yi}$: End moment around the yi axis of the i-th element $M_{zi}$: End moment around the zi axis of the i-th element $U_{xi}$: Displacement in the xi axial direction of the i-th element $U_{yi}$: Displacement in the yi axial direction of the i-th element $U_{zi}$: Displacement in the zi axial direction of the i-th element $\theta_{xi}$: Angular displacement around the xi axis of the i-th element $\theta_{yi}$: Angular displacement around the yi axis of the i-th element $\theta_{zi}$: Angular displacement around the zi axis of the i-th element wherein i=$1\alpha$, $1\beta$, $2\alpha$, $2\beta$, $3\alpha$, and $3\beta$.

$$\begin{pmatrix} \frac{AE}{l} & 0 & 0 & 0 & 0 & 0 & -\frac{AE}{l} & 0 & 0 & 0 & 0 & 0 \\ 0 & \frac{12EI_z}{l^3} & 0 & 0 & 0 & \frac{6EI_z}{l^2} & 0 & -\frac{12EI_z}{l^3} & 0 & 0 & 0 & \frac{6EI_z}{l^2} \\ 0 & 0 & \frac{12EI_y}{l^3} & 0 & -\frac{6EI_y}{l^2} & 0 & 0 & 0 & -\frac{12EI_y}{l^3} & 0 & -\frac{6EI_y}{l^2} & 0 \\ 0 & 0 & 0 & \frac{GJ}{l} & 0 & 0 & 0 & 0 & 0 & -\frac{GJ}{l} & 0 & 0 \\ 0 & 0 & -\frac{6EI_y}{l^2} & 0 & \frac{4EI_y}{l} & 0 & 0 & 0 & \frac{6EI_y}{l^2} & 0 & \frac{2EI_y}{l} & 0 \\ 0 & \frac{6EI_z}{l^2} & 0 & 0 & 0 & \frac{4EI_z}{l} & 0 & -\frac{6EI_z}{l^2} & 0 & 0 & 0 & \frac{2EI_z}{l} \\ -\frac{AE}{l} & 0 & 0 & 0 & 0 & 0 & \frac{AE}{l} & 0 & 0 & 0 & 0 & 0 \\ 0 & -\frac{12EI_z}{l^3} & 0 & 0 & 0 & -\frac{6EI_z}{l^2} & 0 & \frac{12EI_z}{l^3} & 0 & 0 & 0 & -\frac{6EI_z}{l^2} \\ 0 & 0 & -\frac{12EI_y}{l^3} & 0 & \frac{6EI_y}{l^2} & 0 & 0 & 0 & \frac{12EI_y}{l^3} & 0 & \frac{6EI_y}{l^2} & 0 \\ 0 & 0 & 0 & -\frac{GJ}{l} & 0 & 0 & 0 & 0 & 0 & \frac{GJ}{l} & 0 & 0 \\ 0 & 0 & -\frac{6EI_y}{l^2} & 0 & \frac{2EI_y}{l} & 0 & 0 & 0 & \frac{6EI_y}{l^2} & 0 & \frac{4EI_y}{l} & 0 \\ 0 & \frac{6EI_z}{l^2} & 0 & 0 & 0 & \frac{2EI_z}{l} & 0 & -\frac{6EI_z}{l^2} & 0 & 0 & 0 & \frac{4EI_z}{l} \end{pmatrix} \begin{Bmatrix} U_{xi\alpha} \\ U_{yi\alpha} \\ U_{zi\alpha} \\ \theta_{xi\alpha} \\ \theta_{yi\alpha} \\ \theta_{zi\alpha} \\ U_{xi\beta} \\ U_{yi\beta} \\ U_{zi\beta} \\ \theta_{xi\beta} \\ \theta_{yi\beta} \\ \theta_{zi\beta} \end{Bmatrix} = \begin{Bmatrix} F_{xi\alpha} \\ F_{yi\alpha} \\ F_{zi\alpha} \\ M_{xi\alpha} \\ M_{yi\alpha} \\ M_{zi\alpha} \\ F_{xi\beta} \\ F_{yi\beta} \\ F_{zi\beta} \\ M_{xi\beta} \\ M_{yi\beta} \\ M_{zi\beta} \end{Bmatrix} \quad (2)$$

The condition of compatibility and that of equilibrium will now be described. As shown in FIG. 6A, the wire harness shall be expressed by three beam elements C1, C2, C3 for simplicity's sake. In this case, the quantity of displacement of When the continuity of the displacement and the balance of force in the beam elements C1, C2 and C3 shown in FIG. 6B are shown in the same form as the above-mentioned equation (2), the following equation (3) is obtained.

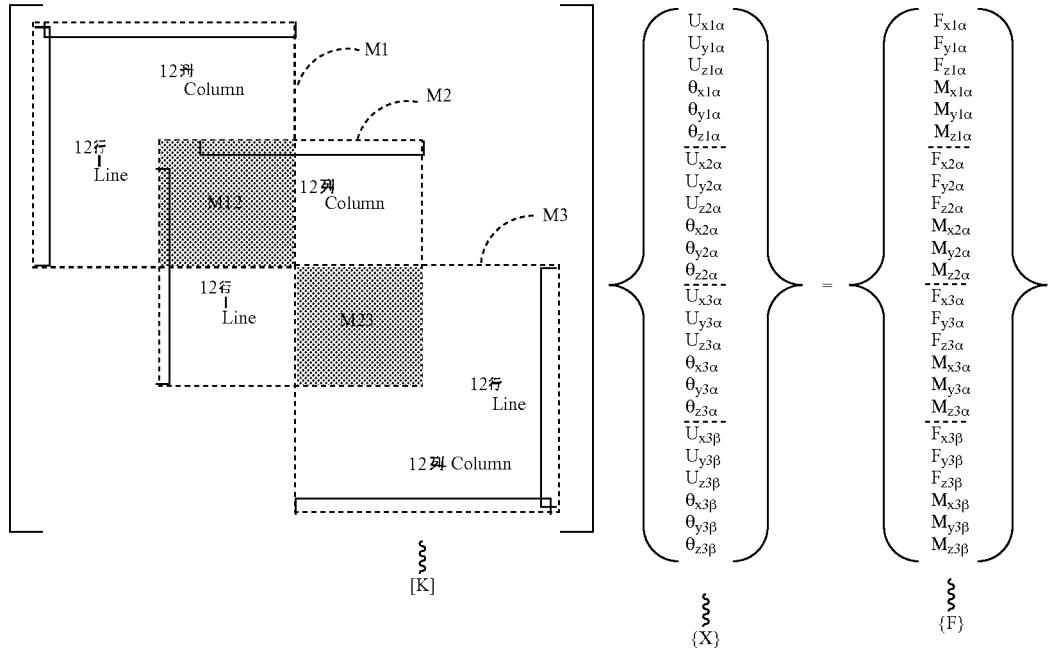

The matrixes M1, M2 and M3 on a line 12 and a column 12 in the equation (3) are the same as that shown in the above equation (2). However, the portions M12 and M23 in which the matrixes M1, M2 and M3 overlap each other are portions in which the structural elements of the matrixes are summed up.

Not smaller than four beam elements can also be handled in the same manner. Thus, a mathematical model of a wire harness divided into an arbitrary number of beam elements can be made. When the above equation (3) is expressed simply, it becomes $$[K]\{x\}=\{F\} \quad (4)$$

On the basis of the equations (3) and (4), therefore, the predictive shape of the wire harness can be calculated by determining the individual elements of the displacement vector $\{x\}$. Here, the aforementioned general matrix finite element method is introduced in the publication "Matrix Finite Element Method", too.

Figure 7A:
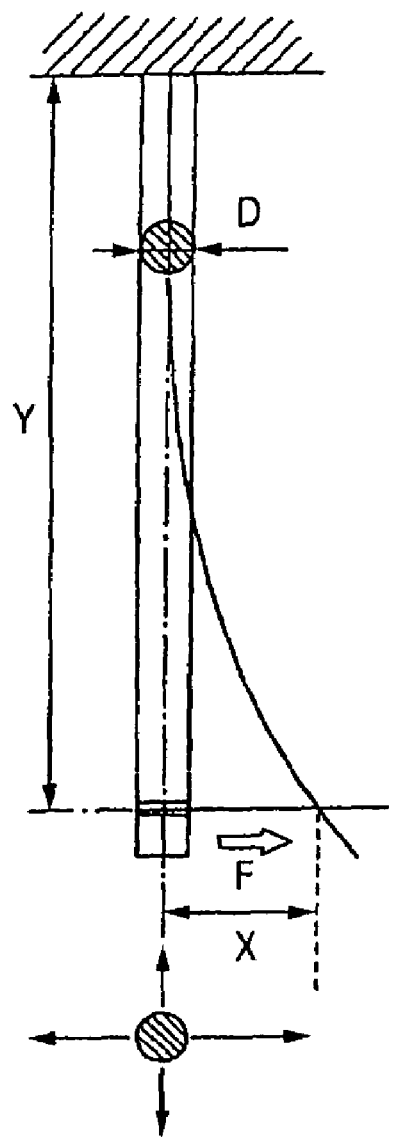
FIG. 7A is a diagram showing the behavior for measuring the geometrical moment of inertia and the modulus of longitudinal elasticity.

One example of the method of determining a Poisson's ratio, a longitudinal elastic modulus and a lateral elastic modulus which are necessary for the prediction of the shape in the present invention will now be described below. FIG. 7A is a drawing showing the measurement of geometrical moment of inertia and a longitudinal elastic modulus, and FIG. 7B a drawing showing the measurement of a polar moment of area and a lateral elastic modulus.

First, an object wire harness is prepared, and the length I, a cross-sectional area A and a density ρ are determined with calipers, a measure, a gravimeter and the like. The values can then be obtained by simple calculations.

When the longitudinal elastic modulus E is measured by using the measuring method shown in FIG. 7A, the result can be expressed by the following equation (5).

$$E=FL^3/3XI \quad (5)$$

The geometrical moment of inertia can be expressed by the following equation (6) since it was assumed that the wire harness had a circular cross section as mentioned above.

$$I=\pi D^4/64 \quad (6)$$

Therefore, the equation becomes:

$$E=64FL^3/3X\pi D^4 \quad (7)$$

In this measurement, the longitudinal elastic modulus E can be determined by measuring the relation between F and x with $E=(F/X)\times(64L^3/3\pi D^4)$.

Figure 7B:
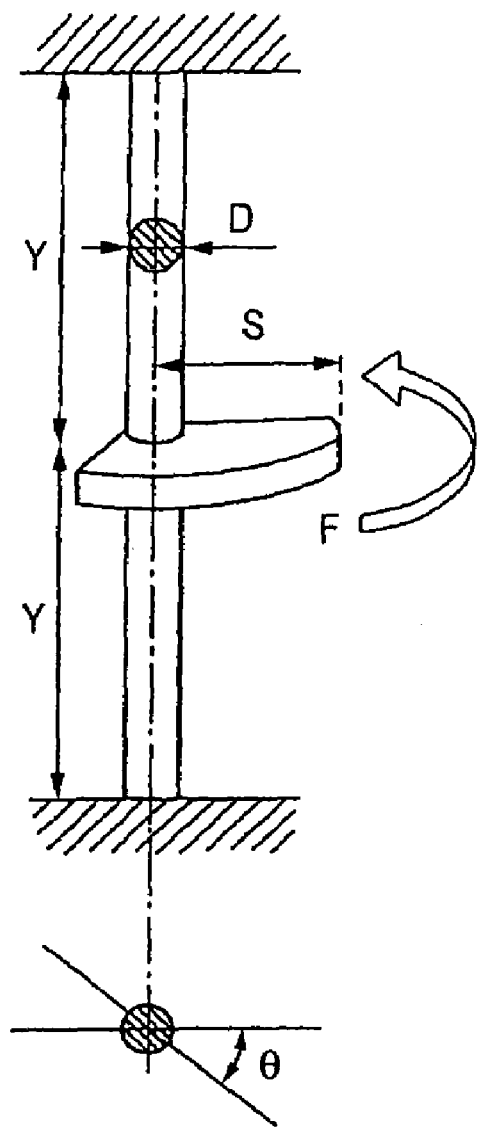
FIG. 7B is a diagram showing the behavior for measuring the polar moment of inertia of area and the modulus of transverse elasticity.

When the lateral elastic modulus G is determined by using the measuring method shown in FIG. 7B, the result can be expressed by the following equation (8).

The polar moment of area J can be expressed by the following equation (9) since it was assumed that the wire harness had a circular cross section.

$$J=\pi D^4/32 \quad (9)$$

The torsional force becomes:

$$T=FS \quad (10)$$

Therefore, $$G=(32FSL/\theta\pi D^4)\times 2=(F/\theta)(32SL/\pi D^4)\times 2 \quad (11)$$

Accordingly, the lateral elastic modulus G can be determined by measuring the relation between F and θ.

The lateral elastic modulus and longitudinal elastic modulus have the relation shown by the following equation (12).

$$G=E/2(1+\mu) \quad (12)$$

wherein μ is a Poisson's ratio.

The above-mentioned measuring method is an example, and each of the lateral elastic modulus G and longitudinal elastic modulus E may also be obtained by a method other than this example of the measuring method.

The description thus far made is concerned with the wire harness. In the invention, the support member is also handled like the wire harness, as described hereinbefore. This is described with reference to FIG. 9 and FIG. 10.

Figure 8:
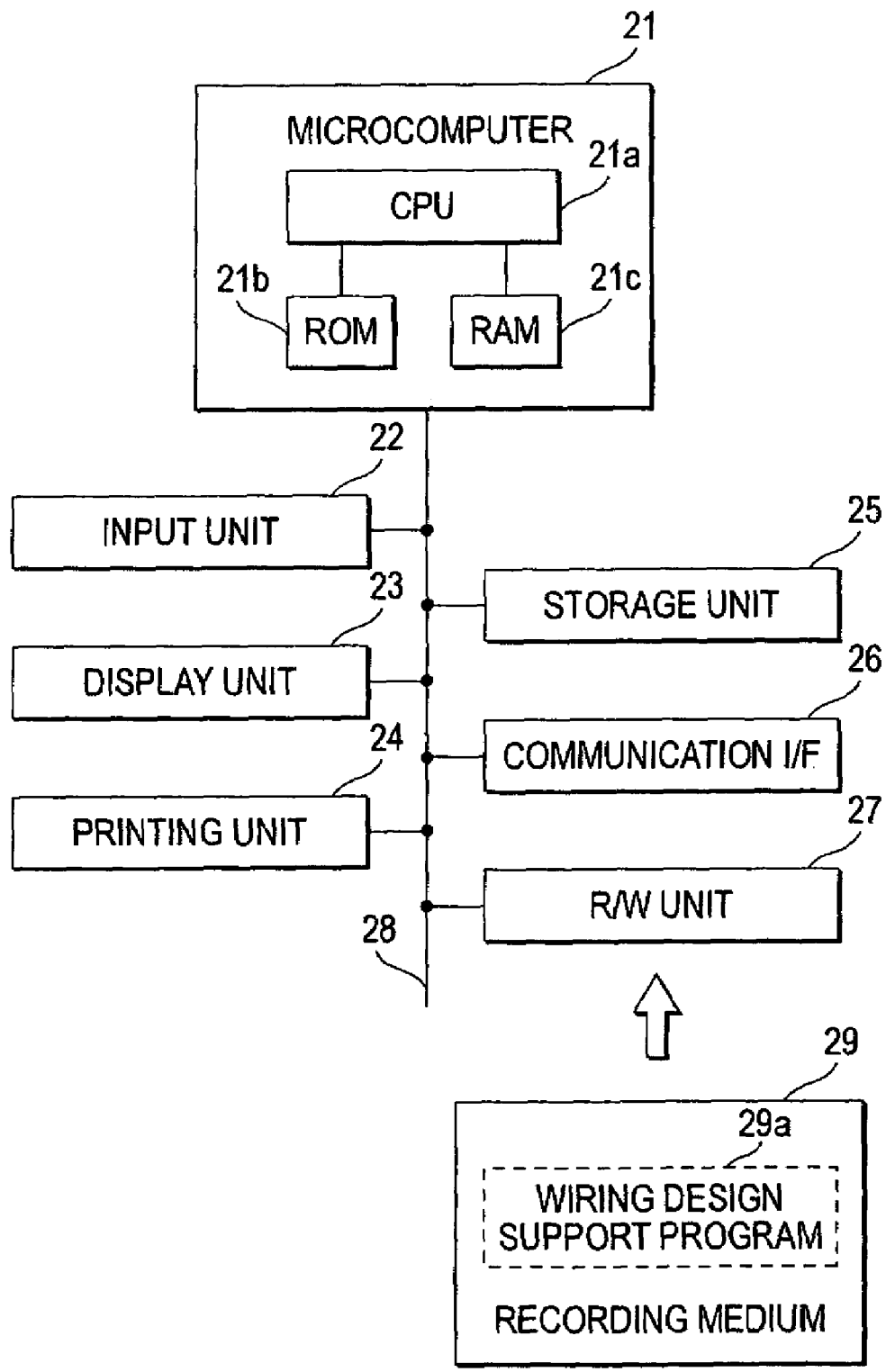
FIG. 8 is a block configuration diagram showing one example of the hardware configuration according to all embodiments of the invention.

The supporting of the design is then done by calculating a predictive shape of the wire harness in accordance with a processing procedure, which will be described later, by utilizing the above theory, basic equations and measurement values. The construction of the hardware in the present invention will be described. FIG. 8 is a block diagram showing the construction of the hardware in all of the modes of embodiments of the present invention.

As shown in FIG. 8, the apparatus according to the present invention includes a microcomputer 21, an input unit 22, a display 23, a printing unit 24, a storage 25, a communication interface 26 and a read/write unit 27. For example, a personal computer is used. Needless to say, a desk top computer and a supercomputer which are other than the personal computer may also be used. The microcomputer 21 includes a CPU 21a (Central Processing Unit), a ROM 21b for storing a boot program, etc., and a RAM 21c for temporarily storing the results of various kinds of processing operations. The input unit 22 is a keyboard, a mouse and the like for inputting the mentioned various values thereinto, the display 23 is a LCD, a CRT and the like for displaying the results of processing operations, and the printing unit 24 a printer for printing the results of processing operations.

The storage 25 stores an installed wiring design support program 29a, i.e. a hard disk drive for storing the results of a process based on this program 29a, while the communication interface 26 is a modem board and the like for making data communication between the communication interface and an external unit by using, for example, internet and a LAN circuit and the like. The read/write unit 27 is a device for reading the wiring design support program 29a stored in a recording medium 29, such as a CD and a DVD, and write the calculation results based on this wiring design support program 29a in the recording medium 29. These structural elements are connected together via an inner bus 28.

The microcomputer 21 installs the wiring design support program 29a read by the read/write unit 27, on the storage 25. When the power is turned ON, the microcomputer 21 is started according to the boot program stored in the ROM 21b, to start the wiring design support program 29a installed. In accordance with the wiring design support program 29a, the microcomputer 21 performs operations for the shape prediction considering the rigidity or the like of the support member, outputs the processed results from the display unit 23 or the print unit 24, and stores the processed results in the storage 25 or the recording medium 29. The wiring design support program 29a can also be installed on another personal computer having the aforementioned basic configuration, and causes, after installed, the computer to function as a wiring design aiding device. Here, the wiring design support program 29a may also be serviced not only from the recording medium 29 but also through the communication lines such as the internet or the LAN.

Figure 3:
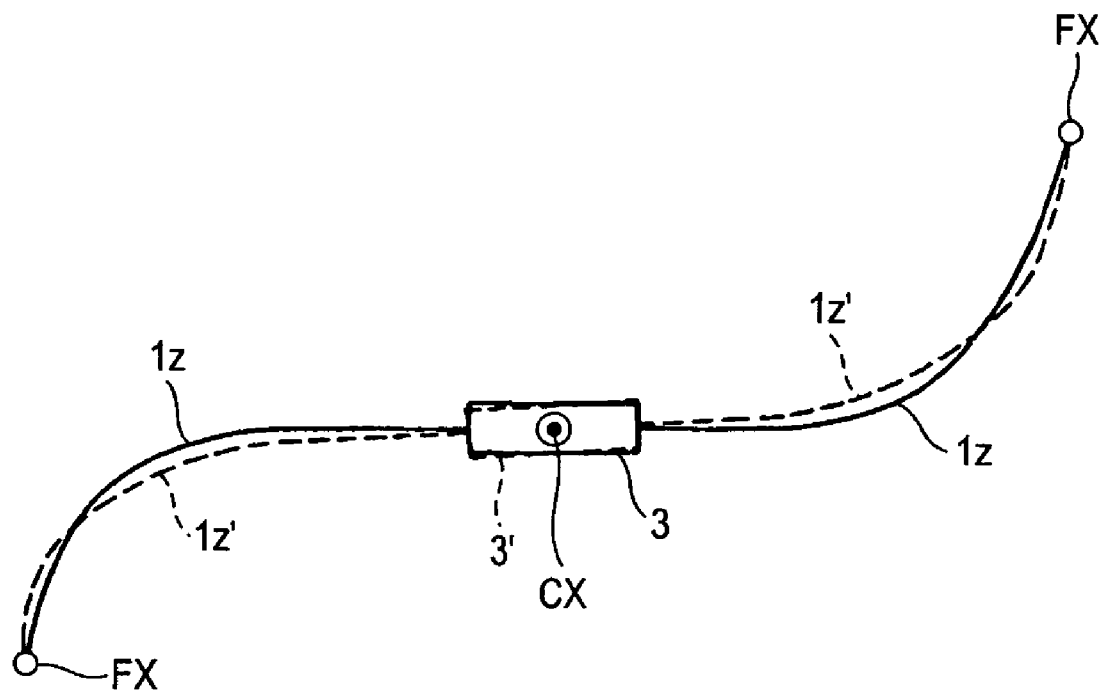
FIG. 3 is a diagram for explaining the difference of a predictive shape, which is made by the inclination of the support member.
Figure 9:
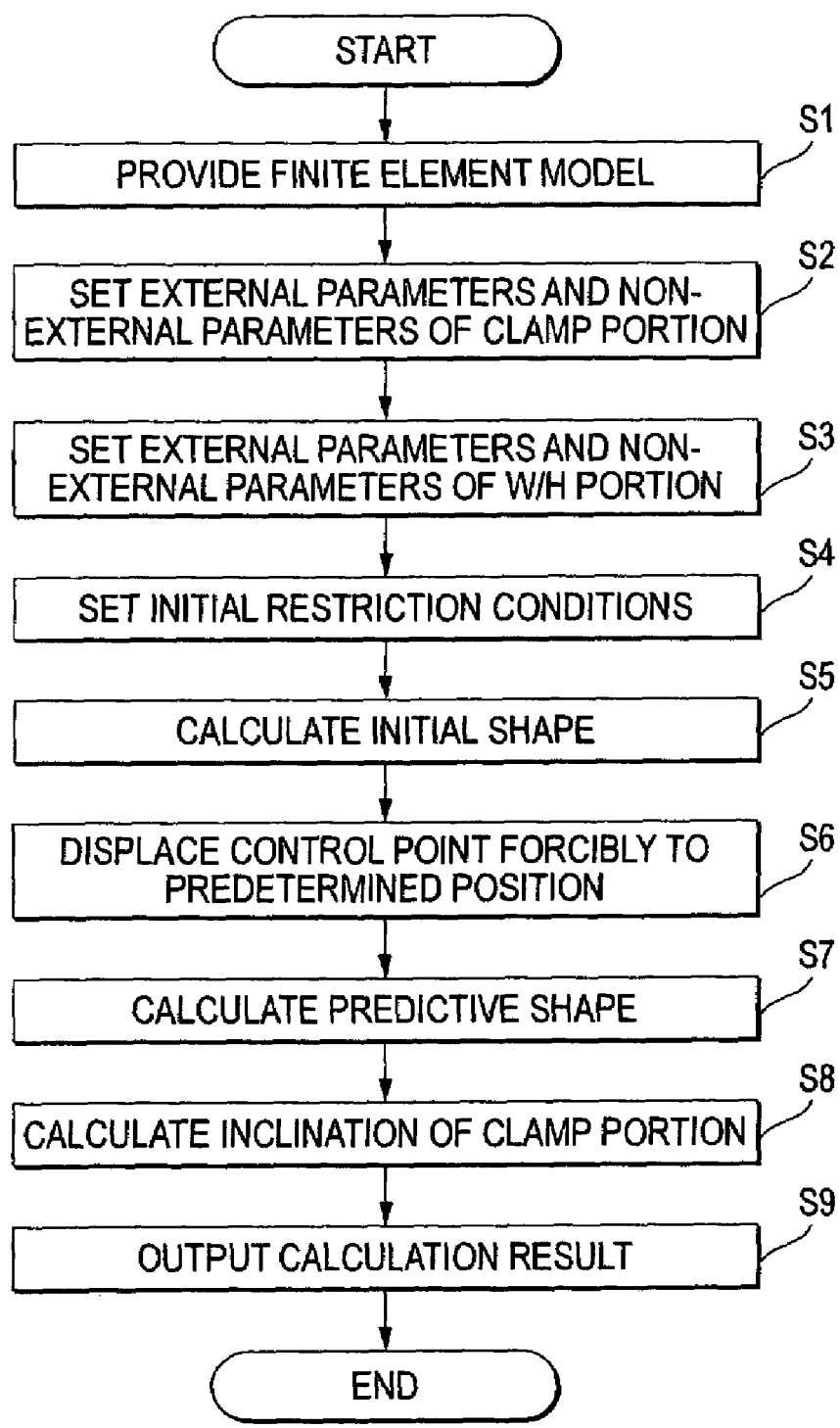
FIG. 9 is a flow chart showing the processing procedure of one embodiment of the invention.

Subsequently, the processing procedure according to the first embodiment is described with reference to FIG. 9 and FIG. 10. FIG. 9 is a flow chart showing the processing procedure of the first embodiment of the invention. FIG. 10A to FIG. 10C are diagrams showing the states, in which the wire harness is deformed at the individual processing operations of FIG. 9. In the wire harness to be designed, it is assumed according to the example shown in FIG. 3 that a clamp is attached as the support member 3 to the intermediate portion of the wire harness. The clamp is a complete restriction type support member like the slot clip, as shown in FIG. 2.

Figure 10A:
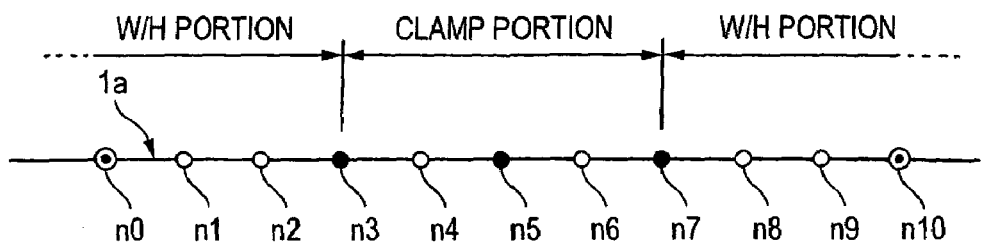
FIG. 10A to FIG. 10C are diagrams showing the states, in which the wire harness is deformed at the individual processing operations of FIG. 9.

At first Step S1 shown in FIG. 9, the finite element model 1a corresponding to the wire harness to be designed is created by the aforementioned method, as shown in FIG. 10A. Specifically, the finite element method 1a is configured of a clamp portion corresponding to the portion to attach the clamp, and a wire harness portion (as will be called the "W/H portion") corresponding to the remaining portion. The length of the clamp portion is made to correspond to the longitudinal length of the clamp, for example.

The clamp portion includes a plurality of beam elements having nodes n3 to n7, and the W/H portion includes a plurality of beam elements having nodes n0 to n2 and n8 to n10. Here, it is assumed that the individual joints are assigned at equal intervals. The operation of Step S1 corresponds to the finite element mode creating step and the finite element model creating unit.

Next, the external parameters and the non-external parameters of the clamp portion and the W/H portion are set, respectively, at Step S2 and Step S3. Supplementarily, the length I, the sectional area A of the clamp portion and the W/H portion are individually set as the external parameters, and the geometrical moment of inertia I, the polar moment of inertia of area J, the Poisson's ratio $\mu$, the density $\rho$, the modulus of longitudinal elasticity E and the modulus of transverse elasticity G of the clamp portion and the W/H portion are individually set as the non-external parameters. It goes without saying that the individual values are set to raise the rigidity of the clamp portion but to lower the rigidity of the W/H portion.

As these values, there are utilized the values which are measured or determined in advance, as described above. The values set here relate to the individual elements in the rigidity matrix [K] in the equation (3). The external parameters and the non-external parameters correspond to the physical properties.

Next at Step S4, the initial restriction conditions are set for the individual joints n0 to n10 of the finite element model 1a. Supplementarily, the restriction kinds (e.g., the complete restriction, the rotational restriction or the complete freedom), the coordinates and so on, as shown in FIG. 2, are set as the initial restriction conditions. At the individual nodes n3 to n7 corresponding to the clamp portion, more specifically, the kind of the restriction conditions of the joint n5 corresponding to the clamp center axis is the complete restriction, and the kind of the restriction conditions of the remaining joints n3, n4, n6 and n7 is completely free. Here, the clamp center axis extends normal to the face of the Drawing and is designated by a point so that it apparently coincides with the joint n5.

In the individual joints n0 to n2 and n8 to n10 corresponding to the W/H portion, moreover, the kind of the restriction conditions of the joints n0 and n10 corresponding to the stationary point and the control point is the complete restriction, and the kind of the restriction conditions of the remaining joints n1, n2, n8 and n9 is completely free. However, the joint n10 corresponding to the control point is forcibly displaced. The individual values set herein relate to the individual elements in the displacement vector $\{x\}$ in the equation (3).

At next Step S5, there is calculated the predictive shape or the state, in which the finite element model is physically balanced, according to the aforementioned set values, that is, the initial shape, as shown at 1a in FIG. 10A. Here, the initial restriction conditions are set such that the objective wire harness is so made at its portion between the joints n0 and n10 as to correspond to the straight extended state. Therefore, the initial shape takes the linear shape, as shown as the finite element model 1a in FIG. 10A. Nevertheless, the initial restriction conditions may also be set to give another shape as the initial shape.

When the wire harnesses are shipped from the wire harness maker to a car maker, for example, they are packaged in a container. In case, however, the wire harnesses extracted from the container are to be distributed to the vehicles, their initial shapes vary depending on how they are folded in the container. By reflecting those folded initial shapes as a starting point on the predictive shape, the more practical reaction evaluations can be calculated.

Here, the finite element method need not always be utilized for the calculations of the initial shape. For these calculations, there may be used either the minimum bending radius depending on the material properties of the wire harness or the bending radius, to which the worker can bend the wire harness by his ordinary force, for example. In either event, it is preferred to output the initial shape, on which the shape of the objective wire harness before assembly is reflected. These shape calculating operations are done by the microcomputer 21. The input unit 22 is used for setting the individual values, and the display unit 23 and/or the print unit 24 is used for outputting the predictive shape. In the subsequent procedure, too, the shape calculating operations are done by the microcomputer 21. The input unit 22 is used for setting the individual values, and the display unit 23 is used for outputting the calculated results.

At next Step S6, the joint n10 corresponding to the control point is forcibly displaced to a predetermined position. In accordance with the destination of this forced displacement, the coordinates of the joint n10 are forcibly displaced. The remaining restriction conditions, external parameters and non-external parameters to be adopted take the values set at Step S2, Step S3 and Step S4.

Figure 10B:
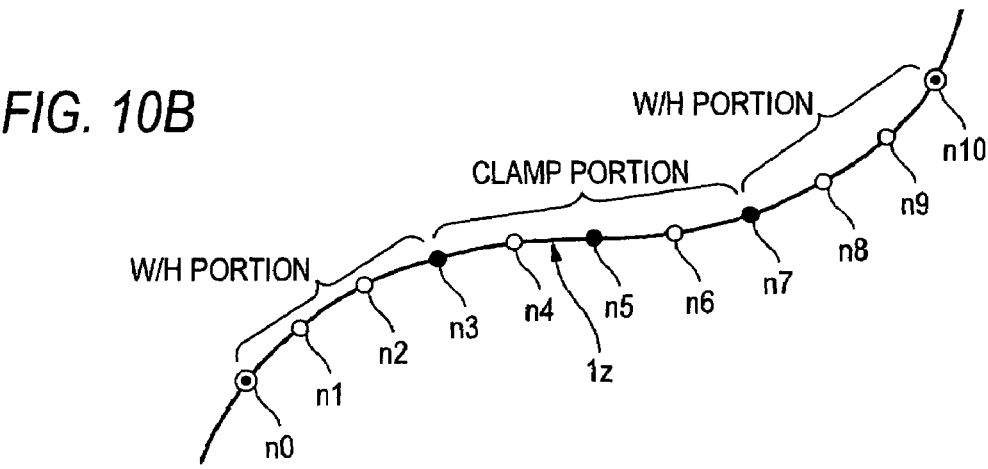
Figure 10C:
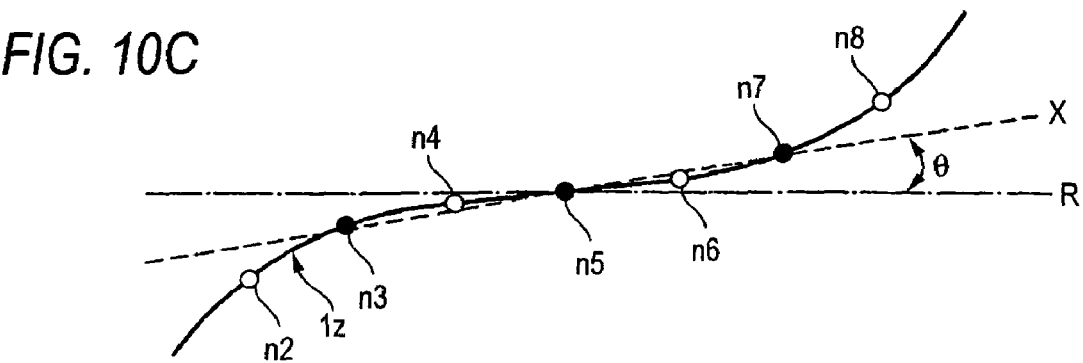

At next Step S7, there is calculated the predictive shape or the state, in which the finite element model is physically balanced, according to the aforementioned set values, that is, the predictive shape, as shown at 1z in FIG. 10B. It is seen in FIG. 10B that the clamp portion between the individual joints n3 and n7 is given a small bent by the physical properties such as the rigidity of the clamp, but that the W/H portion between the joints n0 and n2 and between the joints n8 and n10 is given a large bent by the physical properties of the wire harness. The operation of Step S 7 corresponds to the predictive shape calculating step and the predictive shape calculating unit.

At next Step S8, the inclination of the clamp portion is calculated on the basis of the aforementioned predictive shape 1z. This inclination of the clamp portion is calculated by determining the inclination of the clamp portion with respect to a predetermined reference line R, as indicated by θ in FIG. 10C, on the basis of the coordinates of the joint n5 corresponding to the center axis of the clamp and the joints n3 and n7 corresponding to the two end portions. A straight line X corresponding to the inclination O of the clamp portion can be determined by applying the method of least squares to the coordinates of the joint n5 and the joints n3 and n7, for example. On the other hand, the reference line R is one jointing the coordinates of the joints n3 and n7 of the case, in which the clamp portion has no rigidity. By calculating this inclination θ, effective information is provided for the selection of the support member. Therefore, the information is also effective for the design of the optimum wiring of the wire harness. The operation of Step S8 corresponds to the inclination calculating step and the inclination calculating unit.

At Step S9, moreover, the results thus calculates are outputted to the display unit 23. It is preferred that the calculation results are outputted to not only the display unit 23 but also the print unit 24 and are recorded in the recording medium 29. The output image fleshes out the predictive shape 1z, as shown in FIG. 10B and FIG. 10C, with the thickness of the wire harness and the shape of the clamp, and further with the inclination θ shown in FIG. 10C. It is also preferred to output the initial shape calculated at Step S4, to the display unit 23. The operation of Step S9 corresponds to the result outputting step and the result outputting unit.

According to the embodiment of the invention thus far described, the predictive shape of the wire harness is calculated supposing the rigidity or the like of the support member so that a more practical wiring of the wire harness can be designed.

Here, the foregoing embodiment exemplifies the case, in which the clamp is attached to the intermediate portion of the wire harness. Nevertheless, the invention can also be applied to the case (as referred to 2a to 2d of FIG. 1), in which the support member such as the connector is attached to the end portion of the wire harness. In case the support member is attached to the end portion of the wire harness, it is preferred that not the joint corresponding to the center axis of the support member but the joint corresponding to the portion to be fitted on the mating connector is completely constrained.

On the other hand, the foregoing embodiment exemplifies the case, in which one support member is attached to the wire harness. The calculations can also be made on the case of plural support members. Moreover, the support member should not be limited to the clamp but may be any of the kinds enumerated in FIG. 2.

On the other hand, the foregoing embodiment exemplifies the example of calculating the shape prediction by the forced displacement, but can be applied to the shape prediction at the time when the deformation is made by applying the force to the predetermined joint.

Here, the invention has been described by way of an example of the wire harness wired as the linear structure in the vehicle. Nevertheless, the invention can naturally be applied not only to such wire harness but also to the hose or tube, which has a simpler structure than that of the wire harness and which is arranged outside of the vehicle, or a general electric wire or a single electric wire. In short, the linear structure of the invention includes those hose, tube, general electric wire and single electric wire. Moreover, the invention can also be applied to the wire harness having branches. In addition, the invention can also be likewise applied to the linear structure having not only the circular section but also a rectangular section, an annular section, an elliptical section and an H-shaped section. In short, the linear structure, to which the invention is applied, should not be limited to the circular section.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2004-110992 filed on Apr. 5, 2004, the content of which is incorporated herein for reference.

What is claimed is:

1. A method of supporting an optimum wiring design of a linear structure by a computer, such that the computer performs the steps comprising: providing by the computer, a finite element model which corresponds to both of the linear structure and a support member which supports the linear structure, the finite element model being formed as an elastic body having a plurality of combined beam elements which retain linearity; setting physical properties and restriction conditions of the linear structure and the support member to the finite element model; calculating a predictive shape of the finite element model which is in a physically balanced condition based on the physical properties and the restriction conditions; and outputting a calculation result of the calculation process;

wherein the support member is a complete restriction type support member; wherein a complete restriction is applied to a joint corresponding to a center axis of the support member as one of the restriction conditions; and wherein a complete freedom is applied to a joint corresponding to other than the center axis of the support member as one of the restriction conditions; the method further comprising:

calculating an inclination of the support member with respect to a predetermined reference line on the basis of the joint corresponding to the center axis of the support member and joints corresponding to two end portions of the support member, wherein the outputting process outputs the inclination of the support member along with the calculation result.

2. A supporting apparatus for supporting an optimum wiring design of a linear structure, comprising: a providing unit which provides a finite element model of both of the linear structure and a support member which supports the linear structure, the finite element model being formed as an elastic body having a plurality of combined beam elements which retain linearity; a setting unit which sets physical properties and restriction conditions of the linear structure and the support member to the finite element model; a calculating unit which calculates a predictive shape of the finite element model which is in a physically balanced condition based on the physical properties and the restriction conditions; and an outputting unit which outputs a calculation result calculated by the calculating unit;

wherein the support member is a complete restriction type support member; wherein a complete restriction is applied to a joint corresponding to a center axis of the support member as one of the restriction conditions; and wherein a complete freedom is applied to a joint corresponding to other than the center axis of the support member as one of the restriction conditions; the apparatus further comprising an inclination calculating unit that calculates an inclination of the support member with respect to a predetermined reference line on the basis of the joint corresponding to the center axis of the support member and joints corresponding to two end portions of the support member, wherein the outputting unit outputs the inclination of the support member along with the calculation result of the calculating unit.

3. A computer-readable recording medium for causing a computer to execute the method of supporting an optimum wiring design of a linear structure set forth in claim 1.

\* \* \* \* \*